Oct. 10, 1961          E. S. DE HART          3,003,363
APPARATUS FOR TURNING A STEERING WHEEL FROM A REMOTE POSITION
Filed Aug. 31, 1956          3 Sheets-Sheet 1
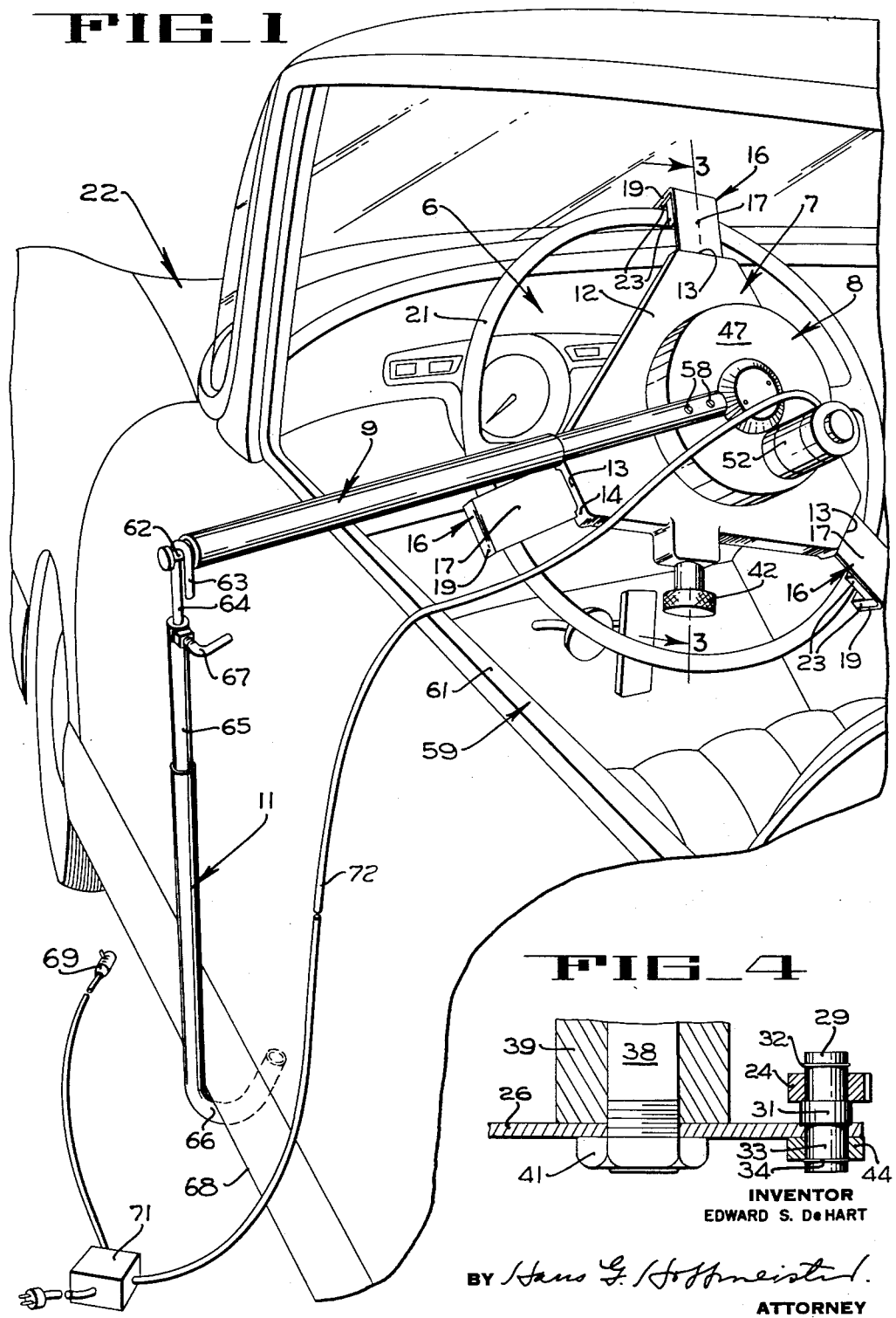
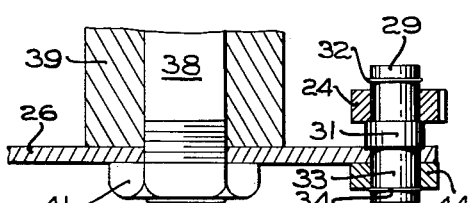
INVENTOR
EDWARD S. De HART
BY *Hans G. Hoffmeister*
ATTORNEY

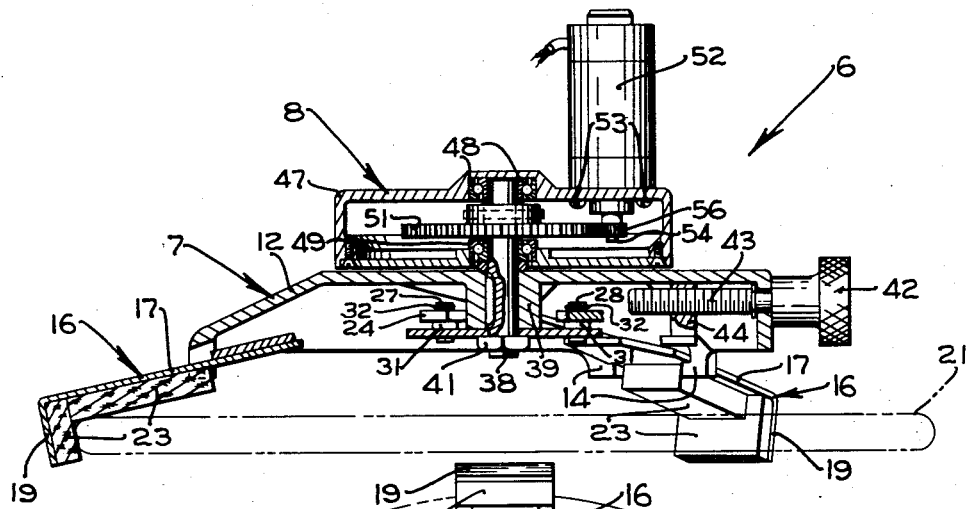
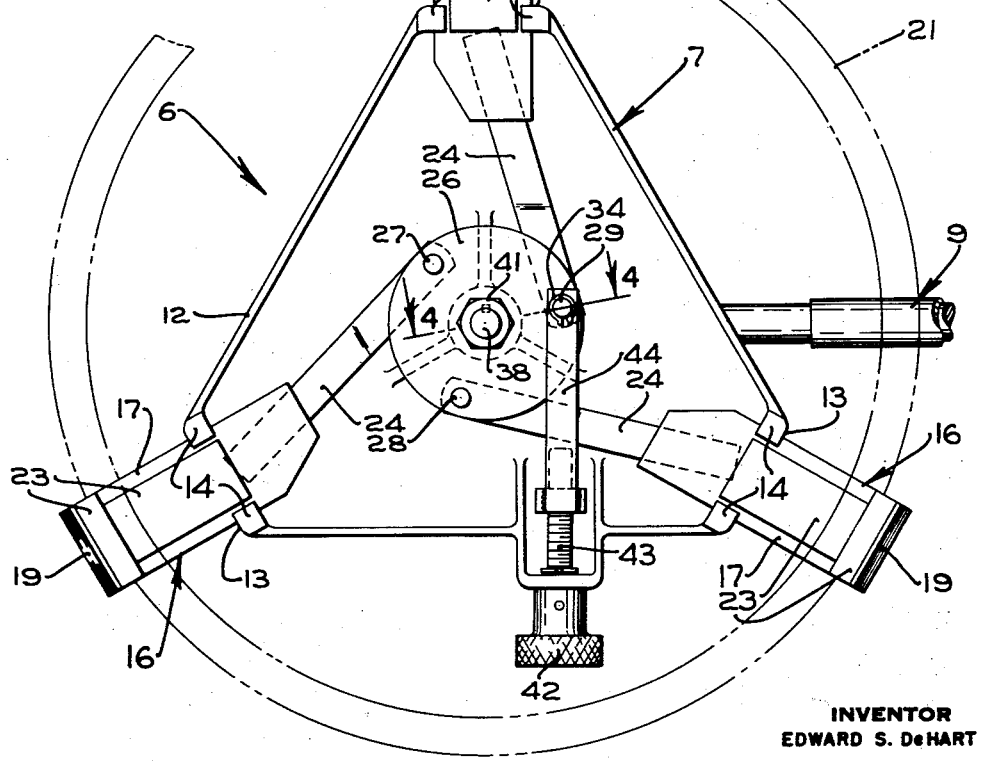

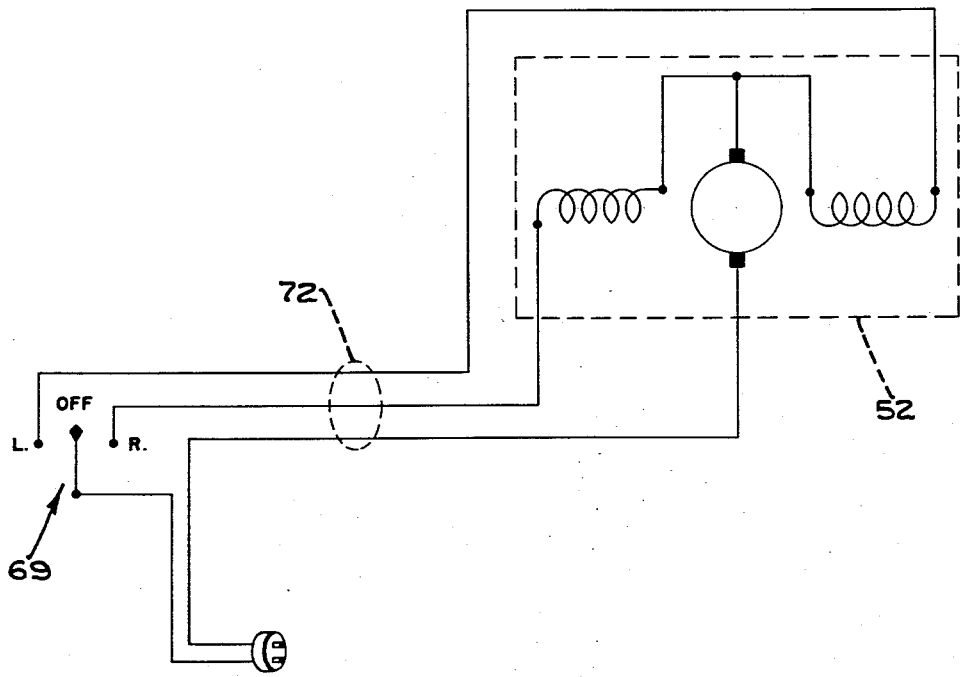

United States Patent Office 3,003,363
Patented Oct. 10, 1961

3,003,363
APPARATUS FOR TURNING A STEERING WHEEL FROM A REMOTE POSITION
Edward S. De Hart, Collingswood, N.J., assignor to FMC Corporation, a corporation of Delaware
Filed Aug. 31, 1956, Ser. No. 607,309
13 Claims. (Cl. 74—494)

This invention appertains to apparatus for turning the steering wheel of an automobile, and more particularly relates to an improved power driven apparatus for controlling, from a remote location, the turning movements of a steering wheel to adjust the position of the road wheels during wheel aligning operations or the like.

In the process of aligning the front wheels of an automobile, a mechanic must from time to time, move the front wheels of the automobile through their complete turning radius so as to determine the effect of his adjustment on toe in, caster and other necessary front wheel adjustments. In order to aid the mechanic in determining the amount of adjustment needed, one method which is commonly employed involves the use of a light beam which is aimed past the front wheels of an automobile and is directed at a suitably calibrated target which the operator can easily see from his working position under the automobile. Thus, it is desirable that the mechanic be able to turn the front wheels of the automobile from his working position thereunder, so that he can complete the aligning job without changing position.

Prior to the introduction of the apparatus of this invention, the mechanic had the choice of several unsatisfactory methods of turning the front wheels of the automobile. He could manually turn the front wheels from his working position under the automobile by exerting a strong turning force on one wheel after each adjustment; he could leave his position under the car, turn the front wheel to the desired position by means of the steering wheel and thereafter return to his position under the car to observe the results and complete the adjustments; or he could employ an assistant to turn the steering wheel as desired. Each of the above methods of turning the front wheels of an automobile has obvious disadvantages which have been eliminated by applicant's novel steering wheel turning apparatus.

It is, therefore, an object of this invention to provide a steering wheel turning apparatus which may be operated from a remote position, such as under an automobile.

Another object is to provide a remote control steering wheel turning apparatus which will enable a mechanic to turn the front wheels of an automobile in either steering direction with little effort.

Another object is to provide an improved means for mounting a remote control steering wheel turning apparatus in a fixed operating position on an automobile.

Another object is to provide an improved clamping device for a steering wheel turning apparatus.

These and other objects and advantages of the present invention will be apparent from the following description taken in connection with the following drawings, in which:

FIG. 1 is a fragmentary perspective, showing the wheel turning apparatus of this invention in its operating position on the steering wheel of an automobile.

FIG. 2 is a bottom plan of the steering wheel clamping device, used with the present wheel turning apparatus, shown in position upon a steering wheel.

FIG. 3 is a section of a portion of the apparatus taken along the lines 3—3 of FIG. 1.

FIG. 4 is a fragmentary section of a portion of the apparatus taken along the lines 4—4 of FIG. 2.

FIG. 5 is a schematic diagram of an electrical circuit for the apparatus of the present invention.

The steering wheel-turning apparatus 6 (FIG. 1) of this invention comprises a driven wheel-engaging clamp 7, a driving unit 8, an arm 9 arranged to hold the housing of the driving unit 8 in a fixed position to resist a turning moment applied to the steering post and an extensible hook 11 adapted to anchor the unit to the automobile.

The driven wheel-engaging clamp 7 comprises a generally triangular housing 12 (FIGS. 1 and 3) having three equally spaced corners or end portions 13. Each end portion 13 is provided with a pair of opposed U-shaped guide members 14 (FIG. 3) within which is slidably mounted an arm 16 which has a central body portion 17 and a downwardly directed clamping flange 19 at its outer end. The flange 19 of each arm 16 and the body portion 17 of the arms are arranged to be placed over and firmly clamped to a steering wheel 21 (FIG. 1) of an automobile 22, as will be explained in detail later, so that rotary movement of the housing 12 will cause rotation of the steering wheel. In order to prevent injury to the steering wheel 21 of the automobile 22, both the body portions 17 and the flanges 19 are provided with cushioning pads 23 (FIG. 3).

A strap 24 (FIG. 2) is secured, as by welding, to the inner end of the body portion 17 of each arm 16 in a canted position and projects inwardly along the under surface of the triangular housing 12 to terminate adjacent a circular plate 26 which is provided with three equally spaced apertures adjacent its circumference. Each strap 24 is pivotally connected to the circular plate 26 by means of a pin 27, 28 or 29. The pins 27, 28 and 29 are provided with an enlarged mounting portion 31 (FIG. 4) formed adjacent the longitudinal midpoint of each pin. In mounting the pins 27, 28 and 29 on the plate 26 as seen in FIG. 2, each pin is fitted in one of the previously mentioned apertures provided in the plate 26 in such a manner that the enlarged portion 31 contacts, and is welded to, the top surface of the plate 26 which faces the under surface of the driver unit 8. The pivot pins 27, 28 and 29 are circumferentially grooved adjacent their outer ends to receive a snap ring 32 therein. The terminal end of each strap 24 is apertured and is pivotally journaled on one of the pivot pins at a point between the enlarged portion 31 and the snap ring 32, thus preventing movement of the straps 24 axially of the pin. The pin 29 (FIG. 4) differs from the pins 27 and 28 only in that it is also provided with a projection 33 which extends outwardly from the bottom surface of the plate 26. The projection 33 is circumferentially grooved adjacent its outer end to receive a snap ring 34 therein. The purpose of this projection 33 will be described shortly.

The circular plate 26 is rotatably mounted at its center on a vertically extending shaft 38 which is keyed to a centrally located hub 39 depending from the triangular housing 12. The circular plate 26 is held in position on the shaft 38 by means of a nut 41.

In order to rotate the circular plate 26 and thereby adjust the radial position of the arms 16, an adjustment screw 42 (FIG. 3) is provided which is received for rotation within a suitably apertured portion of the housing 12. The shank 43 of the adjusting screw 42 is received in threaded engagement within one end of a connecting link 44 while the other end of the link 44 is disposed below the plate 26 and is pivotally connected to the projection 33 (FIG. 4) of the pin 29. Thus, to clamp the wheel-engaging clamp 7 (FIG. 2) on the steering wheel 21, assuming that the arms 16 are initially widely spread, the clamp 7 is first placed in position on the steering wheel 21 as shown in FIG. 1. The adjusting screw 42 is then rotated in the proper direction so as to move the link 44 downwardly, as shown in FIG. 2, which results in rotating the circular plate 26 clockwise and moving the arms 16 radially inward relative to the circular steering wheel 21. Obviously, rotation of the adjusting screw 42 in the opposite direction causes the arms 16 to move outwardly.

It should be noted that the longitudinal axes of the arms 16, when clamped on the steering wheel 21, extend radially inward relative to the pivotal axis of the steering wheel 21 and that the arms 16 will be slightly canted relative to the end portions 13 of the housing 12 when the circular plate 26 is rotated. In order to prevent excessive canting of the arms 16 relative to the housing 12 when the arms are being moved outwardly or inwardly, it is desirable that the pins 27, 28 and 29 be so positioned as to move through an arc, the center of which lies on a radius which is disposed substantially perpendicular to the longitudinal axis of the particular arm to which it is connected.

The driver unit 8 provides means whereby the entire wheel-engaging clamp 7 may be rotated. The driving unit 8 (FIG. 3) comprises a driver housing 47 which is rotatably mounted on the shaft 38 by a pair of spaced bearings 48 and 49. A drive gear 51 is fixed to the shaft 38 and is disposed between the two bearings 48 and 49. A reversible motor 52 is secured to the housing 47 by bolts 53 in such a manner that the motor drive shaft 54 projects within the housing 47 adjacent the gear 51. A pinion 56 is secured to the shaft 54 and is connected in driving engagement with the gear 51. Thus if the reversible motor 52 is started when the housing 47 is held in a stationary position, the gear 51 will be driven by the pinion 56, causing relative motion between the driven wheel-engaging clamp 7 and the stationary housing 47.

In order to hold the housing 47 of the driver unit 8 in a fixed position thereby causing the wheel engaging clamp 7 to rotate when the motor 52 is started, the aforementioned arm 9 and extensible hook 11 are provided. One end of the arm 9 is secured to the driver housing 47 by bolts 58 while the other end of the arm 9 extends outwardly from the automobile 22 through an open side window 59 as shown in FIG. 1. The outer portion of the arm 9 is suitably padded so that the sill 61 of the window 59 will not be marred. A connecting portion 62 immediately adjacent the outer end of the arm 9 is reduced in diameter in order to receive and hold thereon an upper hook 63 of the padded extensible hook 11. The extensible hook 11 is of telescoping construction and comprises an inner member 64 having the upper hook 63 on one end thereof, and a padded outer member 65 which has a hook 66 at its lower end and a clamping device 67 adjacent its upper end. The lower hook 66 is arranged to be placed in engagement under the body sill 68 of the automobile 22. To mount the arm 9 on the body, the lower hook 66 is held in firm contact with the body sill 68 of the automobile 22 and the upper hook 63 is held in firm contact with the arm 9. Then the clamping device 67 is tightened to frictionally lock the inner member 64 and outer member 65 of the extensible hook 11 together. Thus the housing 47 of the driver unit 8 is held in a fixed position against the torque exerted thereon by the reversible motor 52 irrespective of the direction in which the same is driven.

A remote control switch 69 is electrically connected to the motor 52 through a flexible cable 72 and cooperates with an outside source of power which is connected in the control circuit through the terminal box 71. The remote control switch 69 enables an operator, while working under the automobile 22 or when working in some other remote location, to energize the motor 52 to cause the motor drive shaft 54 to be selectively rotated in either direction to thus turn the steering wheel 21 in either direction and to stop the steering wheel 21 in any desired position.

In order to place the steering wheel turning apparatus 6 in operating position, the steering wheel turning apparatus 6 is first placed through the open side window 59 of the automobile 22 so that the arms 16 rest upon the steering wheel 21 as clearly shown in FIG. 1. The adjustment screw 42 is then turned in the direction which pulls the connecting link 44 downwardly (FIG. 2), thereby rotating the circular plate 26 which tightens the arms 16 upon the steering wheel 21 so that no relative rotary motion will exist therebetween. The arm 9 is then placed so that it rests upon the sill 61 of the window 59. The lower hook 66 of the extensible hook 11 is engaged under the body sill 68 and the upper hook 63 is engaged within the diametrically reduced portion 62 adjacent the outer end of the arm 9. The telescoping inner member 64 and outer member 65 of the extensible hook 11 are drawn together and are locked in position by the clamping device 67. The terminal box 71 is connected to the outside source of power. The steering wheel turning apparatus 6 is then ready for operation.

The operator may then make whatever adjustments or mechanical changes that are necessary to the automobile 22 and, while remaining in his working position, may actuate the remote control switch 69 to start the reversible motor 52 and thereby cause the driven wheel-engaging clamp 7 and the steering wheel 21 to rotate, thus turning the front wheels of the automobile.

It can be seen that the steering wheel turning apparatus 6 of this invention provides a novel apparatus which greatly simplifies and reduces the expense of, and time required for, performing certain necessary front wheel adjustments to automobiles, such as toe in and caster adjustments.

While one embodiment of this present invention has been shown and described, it will be understood that various changes and modifications may be made without departing from the spirit of the invention or scope of the appended claims.

Having thus described the present invention and the manner in which the same is to be used, what is claimed as new and desired to protect by Letters Patent is:

1. An apparatus for turning the steering wheel of a vehicle comprising a housing, a housing supported on said clamping member and arranged to journal a shaft journaled for rotation in said housing, clamping means secured to said shaft for rotation therewith and arranged to be locked in clamping engagement on a steering wheel, means secured to said housing and to an external portion of the vehicle remote from the steering wheel to prevent rotation of said housing, driving means connected to said shaft for rotating said shaft and the clamping means and the wheel relative to the stationary housing, and means including a flexible cable connected to said driving means for operatively controlling said driving means from a position removed from the immediate vicinity of the wheel.

2. A vehicle steering wheel turning apparatus comprising a clamping member arranged to be placed in clamping engagement on a steering wheel, a shaft arranged to rotate said clamping member and projecting therefrom coaxially of the wheel, a housing supported on said clamping member and arranged to journal said shaft for rotation therein, torque resisting means secured to said housing and arranged to engage a portion of the vehicle remote from the steering wheel to prevent rotation of the housing, driving means connected in driving engagement to said shaft, and control means connected to said driving means and arranged upon actuation to rotate the clamping member and the wheel relative to said housing.

3. A wheel turning apparatus comprising clamping means arranged to be placed in clamping engagement on a wheel, a shaft arranged to rotate said clamping means and projecting therefrom coaxially of the wheel, a driver housing arranged to journal said shaft for rotation therein, a motor mounted on said driver housing and having a drive member projecting within said housing, a transmission disposed within said housing and coupling the motor drive member to said shaft for rotating said shaft, means secured to said driver housing and arranged to prevent rotation thereof, and remote control means connected to said motor whereby the motor may be controlled from a remote location to thereby rotate the clamping means and the wheel relative to the driver housing.

4. A vehicle steering wheel turning apparatus comprising clamping means arranged to be placed in clamping engagement on a steering wheel, a shaft arranged to rotate said clamping means and projecting therefrom coaxially of the wheel, a driver housing supported on said clamping means arranged to journal said shaft for rotation therein, a gear secured on said shaft and disposed within said driver housing, a reversible motor mounted on said driver housing, a drive shaft projecting from said reversible motor into said driver housing, a pinion secured to said drive shaft in driving relation with said gear, torque resisting means secured to said driver housing and arranged to engage a portion of the vehicle remote from the steering wheel to prevent rotation of the housing, and control means connected to said motor whereby the motor is operated to selectively rotate the clamping means and wheel in either direction.

5. A wheel turning apparatus comprising a radially adjustable clamping means arranged to be placed in clamping engagement on a steering wheel of an automobile, a shaft arranged to rotate said clamping means and projecting therefrom coaxially of the steering wheel, a driver housing arranged to journal said shaft for rotation therein and disposed adjacent said clamping means, a gear secured on said shaft and disposed within said driver housing, a reversible motor mounted on said driver housing, a drive shaft projecting from said reversible motor into said driver housing, a pinion secured to said drive shaft and connected in driving engagement with said gear, torque resisting means including an arm secured on said driver housing and arranged to project outwardly therefrom to rest against a portion of said automobile, and an extensible hook connected between said arm and a second portion of said automobile and arranged to prevent rotation of said driver housing, and remotely located control means connected to said motor whereby the motor is operated to selectively rotate the clamping means and wheel in either direction.

6. A wheel turning apparatus comprising adjustable clamping means arranged to be placed in clamping engagement on a steering wheel of an automobile, a shaft arranged to rotate said clamping means and projecting outwardly therefrom coaxially of the steering wheel, a driver housing arranged to journal said shaft for rotation therein and disposed adjacent said clamping means, a reversible motor mounted on said driver housing, a transmission connecting said motor to said shaft in driving engagement, an arm secured to said driver housing and arranged to project outwardly through a side window of the automobile in contact with the window sill thereby preventing rotation of said driver housing in one direction, an extensible hook arranged to be rigidly connected between a body portion of the automobile and the outer end of said arm to thereby prevent rotation of the driver housing in the opposite direction, and remotely located control means connected to said motor whereby the motor is operated to selectively rotate the clamping device and wheel in either direction.

7. In a steering wheel turning apparatus arranged to be clamped on a circular steering wheel of an automobile the combination of a clamp housing, a plurality of arms slidably mounted in said clamp housing and arranged to project radially outwardly from said housing relative to the axis of the steering wheel, wheel engaging flanges on said arms, a shaft secured in said clamp housing and arranged to project therein coaxially of the steering wheel, a circular plate rotatably mounted on said shaft and disposed within said clamp housing, a connecting link rigidly secured in a canted position to each of said arms and projecting inwardly to terminate adjacent the circumference of said circular plate, a pin pivotally connecting each of said links to said circular plate, said pins being evenly spaced and radially disposed from said shaft, means connected between one of said pins and said clamp housing for rotating said circular plate in either direction to thereby move each of said arms inwardly or outwardly to move said wheel engaging flanges toward or away from the rim of the steering wheel, a gear housing rotatably mounted on said shaft, means for holding said gear housing in stationary position, and power means mounted on said gear housing and connected to said shaft to drive said shaft when said clamp arms are engaged with the rim of the steering wheel and said gear housing is held in stationary position.

8. In a wheel turning apparatus a clamping structure comprising a triangular housing, a rotatable shaft secured in said housing and disposed centrally therein, a clamping arm slidably mounted in each corner of said housing and arranged to be adjustably moved inwardly or outwardly relative thereto, a circular plate rotatably mounted on said shaft and disposed within said housing, a connecting link secured to each arm and terminating immediately adjacent said plate, a pin pivotally connecting each of said links to said circular plate and being offset from the line of movement of said arms, a threaded adjusting screw journaled in said housing, and means connecting said screw to said circular plate at a point spaced from the axis of rotation of said plate whereby rotation of said screw effects rotation of said plate and adjusting movement of said arms.

9. In a wheel turning apparatus the combination of a housing, a plurality of clamping arms slidably mounted within said housing and projecting both outwardly and inwardly of said housing, a shaft disposed centrally in said housing and having a portion projecting into the housing, a circular plate rotatably mounted on said shaft and disposed within said housing adjacent the inner end of said arms, a pin connecting each of said arms to said circular plate, said pins being evenly spaced and radially disposed from said shaft, and means connected between one of said pins and said housing for rotating said circular plate in either direction to thereby move each of said arms inwardly or outwardly.

10. In a steering wheel turning apparatus arranged to be clamped on a circular steering wheel of an automobile the combination of a housing, a plurality of arms slidably mounted in said housing and arranged to project radially outwardly from said housing relative to the axis of the steering wheel, a shaft secured in said housing and arranged to project therein coaxially of the steering wheel, a circular plate rotatably mounted on said shaft and disposed within said housing, a connecting link rigidly secured to each of said arms in a canted position and projecting inwardly to terminate adjacent the circumference of said circular plate, a pin pivotally connecting each of said links to said circular plate, said pins being evenly spaced and radially disposed from said shaft, and means connected between one of said pins and said housing for rotating said circular plate in either direction to thereby move each of said arms inwardly and outwardly.

11. A vehicle steering wheel turning apparatus comprising a clamping member arranged to be placed in clamping engagement with a steering wheel, a shaft arranged to rotate said clamping member and projecting therefrom coaxially of the wheel, driving means supported by said clamping means and connected in driving engagement to said shaft, torque resisting means connected to said driving means and arranged to engage a portion of the vehicle remote from the steering wheel to thereby prevent movement of said driving means, and control means connected to said driving means and arranged upon actuation to rotate the clamping member and the wheel relatively to said driving means.

12. In a steering wheel turning apparatus arranged to be clamped on the steering wheel of an automobile the combination of a clamp housing, a plurality of arms slidably mounted in said clamp housing and projecting radially outward from said housing relatively to the axis of the steering wheel, wheel engaging flanges on said arms, a shaft secured to said clamp housing and arranged to project therein coaxially of the steering wheel, a plate rotatable on said shaft and disposed in said clamp housing, means pivotally interconnecting each of said arms and said plate, means connected between said plate and said clamp housing for rotating said plate to thereby retract and project said arms to move said wheel engaging flanges toward and away from the rim of the steering wheel, a gear housing rotatably mounted on said shaft, means for holding said gear housing in stationary position, and power means mounted on said gear housing and connected to said shaft to drive said shaft when said clamp arms are engaged with the rim of the steering wheel and said gear housing is held in stationary position.

13. A vehicle steering wheel turning apparatus comprising clamping means arranged to be supported by a steering wheel in gripping relation therewith, drive means carried by and connected to said clamping means to impart movement thereto for rotating said steering wheel through said clamping means, a housing for said drive means, an extensible arm having one end rigidly connected to said drive means housing normal to the axis of rotation of the drive means and the other end adapted to receive a hook, an extensible member having a hook at one end adapted to engage the end portion of said extensible arm and a hook at the other end adapted to engage the body sill, and means operatively connected to said drive means to control the operation thereof.

References Cited in the file of this patent

UNITED STATES PATENTS

| | | |
|---|---|---|
| 1,247,732 | Shelton | Nov. 27, 1917 |
| 1,346,023 | Heinrich | July 6, 1920 |
| 1,662,134 | Smith | Mar. 13, 1928 |
| 1,863,567 | Fisher | June 21, 1932 |
| 1,895,638 | Melling | Jan. 31, 1933 |
| 1,908,763 | Kelty | May 16, 1933 |
| 2,052,458 | Froelich | Aug. 25, 1936 |
| 2,466,231 | Guinn et al. | Apr. 5, 1949 |
| 2,468,314 | Vogel | Apr. 26, 1949 |
| 2,509,914 | Goodwine | May 30, 1950 |
| 2,520,071 | Tennefos | Aug. 22, 1950 |
| 2,524,434 | Duket | Oct. 3, 1950 |
| 2,544,955 | Harrelson | Mar. 13, 1951 |
| 2,598,390 | Johnson | May 27, 1952 |
| 2,613,983 | Knudsen | Oct. 14, 1952 |
| 2,709,062 | Lamb | May 24, 1955 |
| 2,761,331 | Buescher | Sept. 4, 1956 |
| 2,761,569 | Iserman | Sept. 4, 1956 |
| 2,805,585 | Besserman | Sept. 10, 1957 |
| 2,815,922 | Thomas et al. | Dec. 10, 1957 |

FOREIGN PATENTS

| | | |
|---|---|---|
| 527,927 | Great Britain | Oct. 18, 1940 |